United States Patent [19]
Kendrick et al.

[11] 3,967,841
[45] July 6, 1976

[54] HIGH PRESSURE TUBULAR SWIVEL JOINT

[75] Inventors: William D. Kendrick, Duncan, Okla.; Bruce J. Frazier, Coffeyville, Kans.

[73] Assignee: Halliburton Company, Duncan, Okla.

[22] Filed: Sept. 22, 1975

[21] Appl. No.: 615,797

[52] U.S. Cl. ............................ 285/276; 285/371; 285/DIG. 11; 285/14
[51] Int. Cl.² ............................................ F16L 27/00
[58] Field of Search ........... 285/276, 275, 272, 122, 285/136, 168, 98, 370, 371, DIG. 11, 282, 365, 366, 367, 14

[56] References Cited
UNITED STATES PATENTS

| | | | |
|---|---|---|---|
| 2,501,680 | 5/1950 | King | 285/98 |
| 3,129,960 | 4/1964 | Schrodt | 285/275 X |
| 3,216,746 | 11/1965 | Watts | 285/370 X |
| 3,497,244 | 2/1970 | Grantom | 285/276 X |
| 3,554,581 | 1/1971 | Mason et al. | 285/367 |
| 3,776,578 | 12/1973 | Jessup et al. | 285/94 |

FOREIGN PATENTS OR APPLICATIONS

| | | | |
|---|---|---|---|
| 672,991 | 11/1965 | Belgium | 285/276 |
| 6,507,214 | 12/1965 | Netherlands | 285/367 |
| 417,249 | 1/1967 | Switzerland | 285/276 |

*Primary Examiner*—Wayne L. Shedd
*Attorney, Agent, or Firm*—John H. Tregoning; Bruce E. Burdick

[57] ABSTRACT

A swivel joint and connection for abutting high pressure hydraulic manifolding, the joint comprising two flanged non-rotating swivel bodies with one of the non-rotating swivel bodies having a rotating swivel body journaled therein. A flanged tubular sleeve is secured between the adjacent end faces of the two non-rotating swivel bodies with the opposite ends of the tubular sleeve received respectively in counterbores formed in one non-rotating swivel body and in the rotating swivel body, respectively. A static annular seal is disposed between the first end of the tubular sleeve and the counterbore in the non-rotating swivel body and a dynamic annular seal is disposed between the end face of the opposite end of the tubular sleeve and the counterbore in the rotating swivel body. Improved composite elastomeric and metallic annular dynamic seals are also disclosed.

19 Claims, 3 Drawing Figures

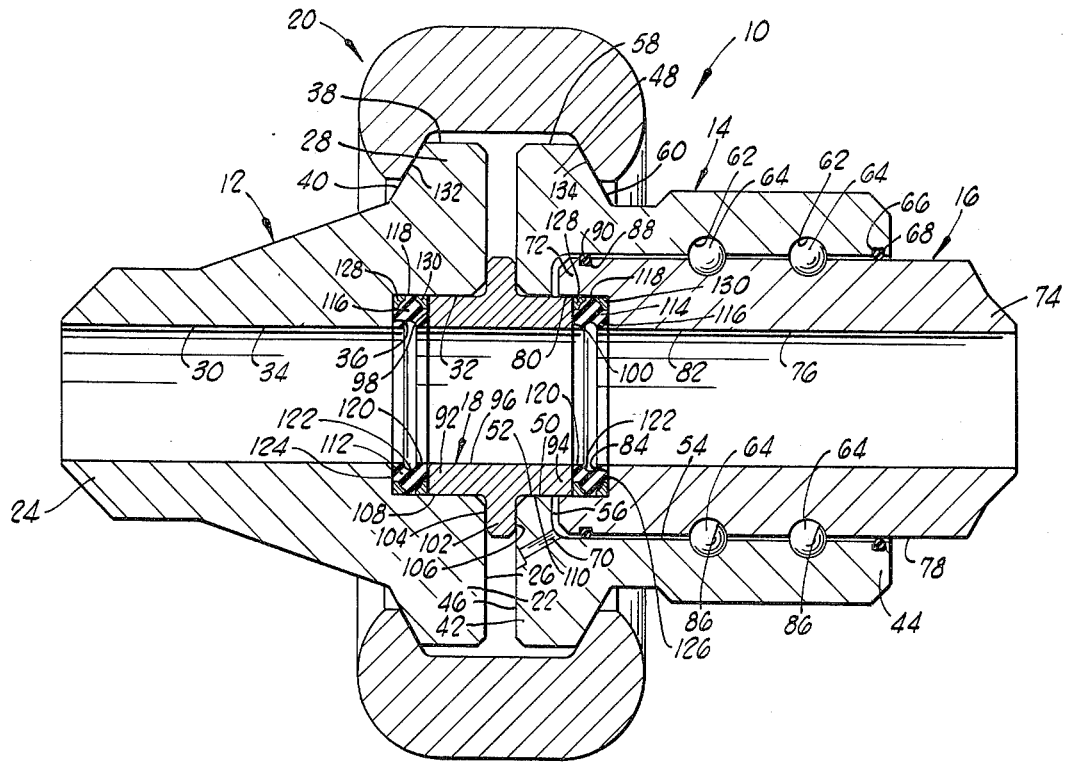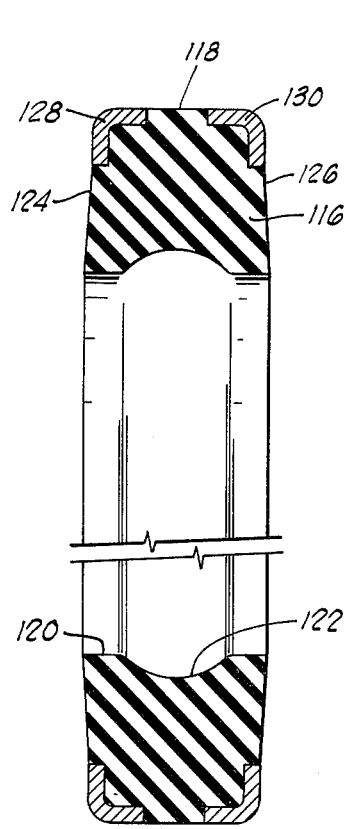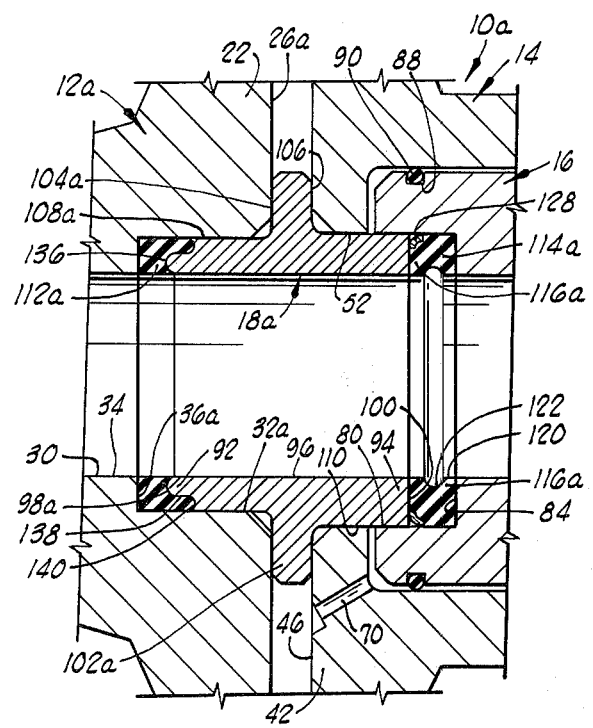

HIGH PRESSURE TUBULAR SWIVEL JOINT

BACKGROUND OF THE INVENTION

1. Field of the Invention

This invention relates generally to improvements in high pressure tubular connections and more particularly, but not by way of limitation, to improvements in high pressure tubular swivel joints.

2. Description of the Prior Art

The prior art contains a number of teachings of high pressure tubular swivel joints. Typical of such swivel joints is that disclosed in U.S. Pat. No. 3,347,570 to H. W. Roessler. In general, the prior art high pressure tubular swivel joints are difficult to disassemble and reassemble when the dynamic or rotating seal requires replacement. Certain of the prior art swivel joints display an annular male member which extends from and forms a permanent part of one of the separated body members which can easily be damaged during the removal and replacement of a defective annular dynamic seal. In the event of such damage, the entire body member on which the male mamber is formed must be replaced. Other prior art high pressure tubular swivel joints are so configured that when the joint connection is parted after a job in which corrosive fluids have been passed therethrough, residual corrosive fluid remains in and around various sealing and structural members of the joint which accelerates the corrosion of such devices and markedly shortens their service life.

The present invention provides seal structure in which the dynamic seal can be removed and replaced quickly and easily in the field without special tools. When the connection of the present invention is parted after each job, the seals are easily removable from the seal cavities and corrosive fluids drain readily from the seal cavity areas to minimize the possibility or corrosion therein. The seal cavities in both halves of the connection of the present invention are female thus preventing the possible damage to an exposed, unprotected male sealing member. The sealing elements of the present invention are readily removable and replaceable in the field thereby minimizing the time required to repair a leaking swivel joint.

SUMMARY OF THE INVENTION

The present invention contemplates a swivel joint comprising a first swivel body having a first end. The first swivel body has an end face on the first end thereof and a passage extending through the first swivel body communicating with the first end. The swivel joint further includes a second swivel body having a first end and a second end, the second swivel body having an end face on the first end thereof and a passage extending through the second swivel body communicating the first and second ends and including a cylindrical inner surface.

The swivel joint also includes a third swivel body having a first end and having a passage extending therethrough communicating with the first end. The third swivel body also has a cylindrical outer surface. The third swivel body is disposed within the cylindrical inner surface of the second swivel body. The passage through the third swivel body includes a first cylindrical inner surface communicating with the first end of the third swivel body and a second inner surface, having a diameter less than the first cylindrical inner surface. A shoulder extends between the first and second inner surfaces of the third swivel body.

Also included in the swivel joint is a sleeve having a first end and a second end and a passage extending therethrough communicating the first and second ends. A first cylindrical outer surface is formed on the sleeve communicating with the first end thereof and is received within the passage through the first swivel body. The sleeve includes a second cylindrical outer surface communicating with the second end of the sleeve. A first end face is formed on the first end of the sleeve and a second end face is formed on the second end of the sleeve, the second end of the sleeve extending into the first cylindrical inner surface of the third swivel body.

Static annular seal means are included and are disposed intermediate the first end of the sleeve and the passage through the first swivel body for providing a fluid-tight seal between the sleeve and the first swivel body. Dynamic annular seal means are disposed intermediate the second end face of the sleeve and the first cylindrical inner surface and the shoulder of the passage extending through the third swivel body for providing a sliding fluid-tight seal between the sleeve and the third swivel body.

Also included in the swivel joint are rotary bearing means disposed intermediate the cylindrical outer surface of the third swivel body and the cylindrical inner surface of the second swivel body for journally supporting the third swivel body within the second swivel body for rotation about the axis of the cylindrical inner surface of the second swivel body.

Additionally included are means for securing the first and second swivel bodies and the sleeve for preventing relative movement therebetween.

Objects and advantages of the invention will be evident from the following detailed description when read in conjunction with the accompanying drawings.

Brief Description of the Drawings

FIG. 1 is a cross-sectional view of the high pressure tubular swivel joint of the present invention.

FIG. 2 is an enlarged cross-sectional view of the dynamic seal employed in the apparatus of FIG. 1.

FIG. 3 is a fragmentary cross-sectional view of a modified form of the high pressure tubular swivel joint of the present invention.

Description of the Preferred Embodiment

Referring now to the drawings and, to FIGS. 1 and 2 in particular, the high pressure tubular swivel joint of the present invention is generally designated by the reference character 10. The swivel joint 10 includes a first non-rotating swivel body 12, a second non-rotating swivel body 14, a rotating or third swivel body 16, a tubular sleeve 18 and a segmental, radially expansible and contractile clamp 20.

The first swivel body 12 has a first end 22 and a second end 24 with a radial end face 26 formed on the first end 22. A radially outwardly extending flange 28 is formed on the first end 22 adjacent the end face 26. A longitudinal passage 30 extends through the swivel body 12 providing communication between the first and second ends 22 and 24. The passage 30 includes a first substantially cylindrical inner surface 32 communicating with the end face 26 and a second substantially cylindrical inner surface 34 coaxial with the inner surface 32 and having a diameter less than the first cylindrical surface 32 and a radial annular shoulder 36 lying in a plane substantially normal to the longitudinal axes of the first and second cylindrical surfaces 32 and 34 of the longitudinal passage 30. The flange 28 includes a substantially cylindrical outer periphery 38 with an externally facing annular wedging surface 40 formed thereon communicating with the outer periphery 38.

The second non-rotating swivel body 14 has a first end 42 and a second end 44 with a radial end face 46 formed on the first end 42. A radially outwardly extending flange 48 is formed on the first end 42 adjacent the first end face 46. A longitudinal passage 50 is formed in the swivel body 14 and communicates between the first and second ends 42 and 44. The passage 50 includes a first substanatially cylindrical inner surface 52 which communicates with the end face 46, a second substantially cylindrical inner surface 54 coaxial with the inner surface 52 and connected thereto by a radial annular shoulder 56 lying in a plane substantially normal to the axes of the inner surfaces 52 and 54 of the longitudinal passage 50. The second substantially cylindrical inner surface 54 has a diameter greater than the first cylindrical inner surface 52. The radially outwardly extending flange 48 includes a substantially cylindrical outer periphery 58 having a diameter substantially equal to the outer periphery 38 of the flange 28 on the first swivel body 12. An externally facing annular wedging surface 60 is formed on the flange 48 and communicates with the outer periphery thereof.

A plurality of arcuately shaped annular grooves 62 are formed in the second cylindrical inner surface 54 of the swivel body 14 in longitudinally spaced relation and provide outer ball bearing races for bearing balls 64 for journally supporting the rotating swivel body 16 in the non-rotating swivel body 14 as will be described hereinafter. An annular groove 66 is formed in the cylindrical inner surface 54 adjacent the second end 44 and intermediate the second end 44 and the bearing races 62. An annular seal 68, preferably an elastomeric O-ring, is disposed within the annular groove 66 to provide a rotating seal between the second swivel body 14 and the rotating swivel body 16. A passage 70 is formed in the first end 42 of the second swivel body 14 and communicates between the annular shoulder 56 and the radial end face 46. The passage 70 provides a flow path for any high pressure fluid which might leak from the swivel joint to avoid introducing such fluid into the bearings supporting the rotating swivel body 16.

The rotating or third swivel body 16 has a first end 72 and a second end 74 with a longitudinal passage 76 extending therethrough communicating between the first and second ends 72 and 74. The rotating swivel body 16 also has a substantially cylindrical outer peripheral surface 78 coaxial with the longitudinal passage 76 and having a diameter slightly less than the diameter of the second cylindrical inner surface 54 of the second swivel body 14. The rotating swivel body 16 is disposed within the second cylindrical inner surface 54 of the second swivel body 14 with the first end 72 adjacent the annular shoulder 56 of the second swivel body 14.

The longitudinal passage 76 includes a first substantially cylindrical inner surface 80 coaxial with the cylindrical outer perihery 78 and communicating with the first end 72, and a second substantially cylindrical inner surface 82 communicating with the second end 74 and coaxial with the first cylindrical inner surface 80 and having a diameter less than the diameter of the first cylindrical inner surface 80. A radial annular shoulder 84, lying in a plane substantially normal to the longitudinal axes of the cylindrical inner surfaces 80 and 82 of the passage 76, interconnects the coaxial cylindrical inner surfaces 80 and 82.

A plurality of arcuately shaped annular grooves or inner bearing races 86 are formed in the substantially cylindrical outer peripheral surface 78 of the rotating swivel body 16 in which the previously described bearing balls 64 roll to journally support the rotating swivel body 16 within the second non-rotating swivel body 14 to provide for relative rotation between the second non-rotating swivel body 14 and the rotating swivel body 16. An annular groove 88 is formed in the cylindrical outer peripheral surface 78 of the rotating swivel body 16 adjacent the first end 72 thereof. An annular seal 90, preferably an elastomeric O-ring, is disposed within the annular groove 88 and provides mutual rotating sealing engagement between the rotating swivel body 16 and the second substantially cylindrical inner surface 54 of the second swivel body 14. The previously mentioned annular seal 68 mutually engages the annular groove 66 of the second swivel body 14 and the substantially cylindrical outer peripheral surface 78 of the rotating swivel body 16 to provide a rotating seal therebetween. The annular seals 90 and 68 isolate and prevent the entrance of foreign matter into the bearing races 62 and 86 to provide prolonged free rolling of the bearing balls 64 therein and extend bearing life.

The tubular sleeve 18 has a first end 92 and a second end 94 and includes a longitudinal passage 96 extending therethrough communicating between the first and second ends 92 and 94. A first radial end face 98 is formed on the first end 92 and lies in a plane substantially normal to the longitudinal axis of the passage 96. A second radial end face 100 is formed on the second end 94 and also lies in a plane substantially normal to the longitudinal axis of the longitudinal passage 96. An outwardly extending radial flange 102 is formed on the exterior of the sleeve 18 intermediate the first and second ends 92 and 94. The flange 102 includes a first radial face 104 and a second radial face 106 formed thereon each lying in a plane substantially normal to the longitudinal axis of the longitudinal passage 96. A first substantially cylindrical outer surface 108 is formed on the sleeve 18 and extends from the first radial face 104 of the flange 102 to the first radial end face 98. A second substantially cylindrical outer surface 110 extends from the second radial face 106 of the radial flange 102 to the second radial end face 100. The first and second cylindrical outer surfaces 108 and 110 are preferably of the same diameter and the longitudinal distances between the plane of the first radial face 104 and the first radial end face 98, and between the plane of the second radial face 106 and the second radial end face 100 are also preferably equal.

The diameter of the first cylindrical outer surface 108 is slightly less than the diameter of the first substantially cylindrical inner surfacce 32 of the first non-rotating swivel body 12 and is received therein with the first radial face 104 of the flange 102 abutting the radial end face 26 of the first swivel body 12. The diameter of the second substantially cylindrical outer surface 110 is slightly less than the diameter of the first substantially cylindrical inner surface 52 of the second non-rotating swivel body 14 and slightly less than the diameter of the first subtantially cylindrical inner surface 80 of the rotating swivel body 16. The second substntially cylindrical outer surface 110 extends through the first substantially cylindrical inner surface 52 of the second swivel body 14 and is received within the first cylindrical inner surface 80 of the rotating swivel body 16 with the second radial face 106 of the radial flange 102 abutting the radial end face 46 of the second swivel body 14.

A static resilient annular seal 112 is disposed intermediate and in mutual contact with the first radial end face 98 of the tubular sleeve 18 and the annular shoulder 36 of the first non-rotating swivel body 12. A dynamic resilient annular seal 114 is disposed intermediate and in mutual contact with the second radial end face 100 of the tubular sleeve 18 and the annular shoulder 84 of the rotating swivel body 16. The static and dynamic annular seals 112 and 114 are preverably identical in construction and are interchangeable one with the other. The individual elements of the annular seals 112 and 114 will, therefore, be assigned the same reference characters.

FIG. 2 illustrates the resilient annular seal 112 in the relaxed position prior to installation in the swivel joint 10. The resilient annular seal 112 comprises an annular resilient elastomeric member 116, suitably formed of Buna-N, having a substantially cylindrically shaped outer periphery 118 and a substantially cylindrically shaped inner periphery 120 having a substantially arcuately shaped annular groove 112 formed therein. In a relaxed position as shown in FIG. 2, the opposite end faces 124 and 126 of the annular seal communicate between the outer and inner peripheries 118 and 120 and are substantially frusto-conically shaped, each tapering axially inwardly and radially outwardly from its respective line of intersection with the inner periphery 120. An annular metallic seal member 128, having an L-shaped cross-section, is bonded to the exterior of the annular elastomeric member 116 along the line of intersection between the end face 124 and the outer periphery 118 with the outer surface of one leg of the seal member 128 aligned substantially parallel with the outer periphery 118 and with the outer surface of the other leg of the seal member 128 aligned substantially parallel with the end face 124. A second L-shaped seal member 130, also having an L-shaped cross-section, is bonded to the exterior of the annular elastomeric mamber 116 along the line of intersection between the end face 126 and the outer periphery 118 with the outer surface of one leg of the seal member 130 substantially aligned with the outer periphery 118 and with the outer surface of the other leg substantially aligned with the end face 126. The annular seal members 128 and 130 may be suitably formed of brass, bronze or stainless steel.

When the static and dynamic resilient annular seals 112 and 114 are installed as shown in FIG. 1, the end faces 124 and 126 are axially compressed a small amount by the abutting end faces 36 and 98, and the abutting end faces 100 and 84, respectively. It should be understood that the diameter of the cylindrically shaped outer periphery 118 of the annular elastomeric member 116 of the annular seals 112 and 114 is selected so as to provide an axially sliding fit within the first substantially cylindrical surface 32 of the first non-rotating swivel body 12 and the first substantially cylindrical inner surface 80 of the rotating swivel body 16. It should also be understood that the diameter of the cylindrically shaped inner periphery 120 of the static and dynamic annular seals 112 and 114 is preferably substantially equal to the diameters of the second substantially cylindrical inner surface 34 of the first non-rotating swivel body 12, the second substantially cylindrical inner surface 82 of the rotating swivel body 16 and the longitudinal passage 96 of the tubular sleeve 18 to provide a flow path through the tubular swivel joint 10 presenting a minimum of resistance to fluids passing therethrough.

It will be noted at this point that the construction of the tubular sleeve 18 and the annular seals 112 and 114 prevents the inadvertent misassembly of the swivel joint 10 such as by reversing the ends of the tubular sleeve 18 or by interchanging the static and dynamic annular seals 112 and 114.

The segmental, radially expansible and contractile clamp 20 is provided with internally facing annular wedging surfaces 132 and 134 which engage the complementary wedging surfaces 40 and 60 on the first and second non-rotating swivel bodies 12 and 14, respectively. Further details of the clamp 20, as well as alternative means for bringing the elements 12 and 14 to the conditions shown in FIG. 1 can be seen in the U.S. Pats. to Watts et al., Nos. 2,766,829; 2,766,998; 2,766,999 and 3,181,901 incorporated by reference herein.

Description of the Embodiment of FIG. 3

FIG. 3 illustrates a high pressure tubular swivel joint differing slightly from the previously described swivel joint 10 which will be designated by the reference character 10a. Those elements of the swivel joint 10a which are identical to the previously described swivel joint 10 will be designated by the same reference characters used above.

In the swivel joint 10a, the first substantially cylindrical inner surface 32a of the slightly modified first non-rotating swivel body 12a has a diameter substantially less than the diameters of the first substantially cylindrical inner surface 52 of the second non-rotating swivel body 14 and the first substantially cylindrical inner surface 80 of the rotating swivel body 16. The first and second substantially cylindrical inner surfaces 32a and 34 of the first swivel body 12 are interconnected by a slightly modified radially extending annular shoulder 36a. The first cylindrical inner surface 32a communicates with a slightly modified radial end face 26a.

The high pressure tubular swivel joint 10a also employs a slightly modified tubular sleeve 18a. The tubular sleeve 18a includes a first substantially cylindrical outer surface 108a which extends from the first radial face 104a of the radial flange 102a to a modfied radial end face 98a formed on the first end 92 of the tubular sleeve 18a. The diameter of the first substantially cylindrical outer surface 108a is sized to be axially slidingly received with the first substantially cylindrical inner surface 32a of the first non-rotating swivel body 12a. It will be noted that the diameter of the first substantially cylindrical outer surface 108a is also less than the diameter of the second substantially cylindrical outer surface 110 of the tubular sleeve 18a.

The end face 98a of the tubular sleeve 18a includes an axially outwardly extending annular lip 136 formed thereon adjacent the longitudinal passage 96 which communicates with a cylindrical outer surface 138 extending axially therefrom toward the radial flange 102a which, in turn, communicates with the first substantially cylindrical outer surface 108a via an annular shoulder 140. A modified static resilient annular seal 112a, preferably formed of an elastomeric material such as Buna-N, is positioned intermediate the end face 98a of the tubular sleeve 18a and the annular shoulder 36a of the first non-rotating swivel body 12a. It will be seen that the static annular seal 112a conforms to the configuration of the radial end face 98a and provides a static seal between the end face 98a of the tubular sleeve 18a and the cylindrical inner surface 32a and annular shoulder 36a of the first non-rotating swivel body 12a.

It will be noted that a slightly modified dynamic resilient annular seal 114a is positioned between the second radial end face 100 of the tubular sleeve 18a and the first substantially cylindrical inner surface 80 and the annular shoulder 84 of the rotating swivel body 16. The modified dynamic annular seal 114a differs from the previously described dynamic annular seal 114 only in the fact that a single L-shaped metallic seal member 128 is employed therein. It will be seen in FIG. 3 that the dynamic resilient annular seal 114a is properly positioned with the L-shaped seal member 128 positioned adjacent to the second radial end face 100 of the tubular sleeve 18a and the cylindrical inner surface 80 of the rotating swivel body 16. This positioning of the L-shaped metallic seal member 128 prevents the extrusion of the annular elastomeric member 116a between the second cylindrical outer surface 110 of the tubular sleeve 18a and the first cylindrical inner surface 80 of the rotating swivel body 16 upon the application of high pressure to the interior of the high pressure tubular swivel joint 10a.

It will be noted that in either of the high pressure tubular swivel joints 10 or 10a the clamp 20 can be removed from the first and second non-rotating swivel bodies 12 or 12a and 14 whereby they may be separated and the tubular sleeves 18 or 18a removed completely therefrom along with the static and dynamic annular seals 112 and 114, and 112a and 114a. Such convenient disasembly of the sealing elements of the high pressure tubular swivel joint of the present invention permits the convenient flushing and drainage of the interior of the swivel joint at the points of static and dynamic sealing and the convenient renewal of static and dynamic seals as well as associated tubular sleeve.

Changes may be made in the construction and arrangement of parts or elements of the various embodiments described herein without departing from the spirit and scope of the present invention.

What is claimed is:

1. A swivel joint comprising:
   a first swivel body having a first end, said first swivel body having an end face on the first end thereof, and a passage extending through said first swivel body communicating with the first end;
   a second swivel body having a first end and a second end, said second swivel body having an end face on the first end thereof, and a passage extending through said second swivel body communicating the first and second ends, said passage including a cylindrical inner surface;
   a third swivel body having a first end and having a passage extending therethrough communicating with the first end thereof, and a cylindrical outer surface, said third swivel body being disposed within the cylindrical inner surface of said second swivel body, said passage through said third swivel body including: a first cylindrical inner surface communicating with the first end of the third swivel body; a second inner surface having a diameter less than the diameter of the first cylindrical inner surface; and a shoulder extending between the first and second inner surfaces;
   a sleeve having a first end and a second end and a passage extending therethrough communicating the first and second ends, said sleeve including: a first cylindrical outer surface communicating with the first end of said sleeve and received within the passage through said first swivel body; a second cylindrical outer surface communicating with the second end of said sleeve; a first end face formed on the first end of said sleeve; and a second end face formed on the second end of said sleeve with the second end of said sleeve extending into the first cylindrical inner surface of said third swivel body;
   static annular seal means disposed intermediate the first end of said sleeve and the passage through said first swivel body for providing a fluid-tight seal between said sleeve and said first swivel body;
   dynamic annular seal means disposed intermediate the second end face of said sleeve and the first cylindrical inner surface and the shoulder of the passage extending through said third swivel body for providing a sliding fluid-tight seal between said sleeve and said third swivel body;
   rotary bearing means disposed intermediate the cylindrical outer surface of said third swivel body and the cylindrical inner surface of said second swivel body for journally supporting said third swivel body within said second swivel body for rotation about the axis of the cylindrical inner surface of said second swivel body; and
   means for mutually securing said first swivel body, said second swivel body and said sleeve for preventing relative movement therebetween.

2. The swivel joint as defined in claim 1 characterized further to include:
   retainer means mutually engaging said third swivel body and said second swivel body for preventing mutual displacement thereof along the axis of rotation of said third swivel body.

3. The swivel joint as defined in claim 1 characterized further to include:
   first annular seal means interposed between the cylindrical outer surface of said third swivel body and the cylindrical inner surface of said second swivel body intermediate said rotary bearing means and the first end of said third swivel body for providing a seal between said third swivel body and said second swivel body; and
   a passage in said second swivel body communicating between a point adjacent said first annular seal means in the passage extending therethrough and the end face of said second swivel body.

4. The swivel joint as defined in claim 3 characterized further to include:
   second annular seal means interposed between the cylindrical outer surface of said third swivel body and the cylindrical inner surface of said second swivel body intermediate said rotary bearing means and the second end of said second swivel body for providing a seal between said third swivel body and said second swivel body.

5. The swivel joint as defined in claim 1 wherein said dynamic annular seal means is characterized further to include:

an annular resilient member having a cylindrically shaped outer periphery, a cylindrically shaped inner periphery, and frusto-conically shaped opposite end faces interconnecting the inner and outer peripheries, the opposite end faces each tapering axially inwardly and radially outwardly from a respective line of intersection with the inner periphery; and an annular metallic seal member, having an L-shaped cross-section, bonded to the exterior of said annular resilient member along the line of intersection between one end face and the outer periphery of said annular resilient member.

6. The swivel joint as defined in claim 5 wherein said dynamic annular seal means is positioned between said sleeve and said third swivel body with said annular metallic seal member mutually engaging the second end face of said sleeve and the first cylindrical inner surface of said third swivel body.

7. The swivel joint as defined in claim 1 wherein said dynamic annular seal means is characterized further to include:

an annular resilient member having a cylindrically shaped outer periphery, a cylindrically shaped inner periphery and frusto-conically shaped opposite end faces interconnecting the inner and outer peripheries and each tapering axially inwardly and radially outwardly from a respective line of intersection with the inner periphery, the cylindrically shaped inner periphery of said annular resilient member including an annular groove formed therein intermediate the opposite end faces; and a pair of annular metallic seal members, each having an L-shaped cross-section, bonded, respectively, to the exterior of said annular resilient member along the lines of intersection between the opposite end faces and the outer periphery of said annular resilient member.

8. The swivel joint as defined in claim 7 wherein:

the passage through said first swivel body includes a first cylindrical inner surface communicating with the end face, a second inner surface having a diameter less than the diameter of the first cylindrical inner surface and a shoulder extending between the first cylindrical inner surface and the second inner surface;

the diameters of the first cylindrical inner surface of said first swivel body and the first cylindrical inner surface of said third swivel body are equal;

the diameters of the first and second cylindrical outer surfaces of said sleeve are equal; and said dynamic annular seal means and said static annular seal means are identical in construction and interchangeable one with the other.

9. The swivel joint as defined in claim 8 wherein said sleeve is characterized further to include:

an outwardly extending flange on the exterior thereof intermediate the first and second cylindrical outer surfaces and spaced axially equidistant between the first and second end faces.

10. A swivel joint comprising:

a first swivel body having a first end, said first swivel body having an end face on the first end thereof and a passage extending through said first swivel body communicating with the first end, said passage including: a first cylindrical inner surface communicating with the end face; a second inner surface having a diameter less than the diameter of the first cylindrical inner surface; and a shoulder extending between the first and second inner surfaces;

a second swivel body having a first end and a second end, said second swivel body including: an end face on the first end thereof; and a passage extending through said second swivel body communicating the first and second ends, said passage including: a first inner surface communicating with the end face; a second cylindrical inner surface; and a shoulder extending between said first and second inner surfaces;

a third swivel body having a first end and having a passage therein communicating with the first end thereof and having a cylindrical outer surface having a diameter less than the diameter of the second cylindrical inner surface of said second swivel body, said third swivel body being disposed within the second cylindrical inner surface of said second swivel body, said passage through said third swivel body including: a first cylindrical inner surface communicating with the first end of said third swivel body; a second inner surface having a diameter less than the diameter of the first cylindrical inner surface; and a shoulder extending between the first and second inner surfaces;

a sleeve having a first end and a second end and a passage extending therethrough communicating the first and second ends, said sleeve further including: an outwardly extending flange formed on the exterior of said sleeve intermediate the first and second ends; a first cylindrical outer surface on said sleeve communicating with the first end of said sleeve and being received within the first cylindrical inner surface of said first swivel body; a second cylindrical outer surface on said sleeve communicating with the second end of said sleeve; a first end face on the first end of said sleeve; and a second end face on the second end of said sleeve, the second end of said sleeve extending into the first cylindrical inner surface of said third swivel body;

static annular seal means disposed intermediate the first end of said sleeve and the first cylindrical inner surface of said first swivel body for providing a fluid-tight seal between said sleeve and said first swivel body;

dynamic annular seal means disposed intermediate the second end face of said sleeve and the first cylindrical inner surface and the shoulder of said third swivel body for providing a sliding fluid-tight seal between said sleeve and said third swivel body;

rotary bearing means disposed intermediate the cylindrical outer surface of said third swivel body and the second cylindrical inner surface of said second swivel body for journally supporting said third swivel body within said second swivel body for rotation about the axis of the second cylindrical inner surface of said second swivel body; and means for connecting said first and second swivel bodies and engaging the outwardly extending flange of said sleeve between the end faces of said first and second swivel bodies and preventing relative movement therebetween.

11. The swivel joint as defined in claim 10 characterized further to include:

retainer means mutually engaging said third swivel body and said second swivel body for preventing mutual displacement thereof along the axis of rotation of said third swivel body.

12. The swivel joint as defined in claim 10 characterized further to include:
first annular seal means interposed between the cylindrical outer surface of said third swivel body and the second cylindrical inner surface of said second swivel body intermediate said rotary bearing means and the first end of said third swivel body for providing a static and dynamic seal between said third swivel body and said second swivel body; and
a passage formed in said second swivel body communicating between the annular shoulder and the end face thereof.

13. The swivel joint as defined in claim 12 characterized further to include:
second annular seal means interposed between the cylindrical outer surface of said third swivel body and the second cylindrical inner surface of said second swivel body intermediate said rotary bearing means and the second end of said second swivel body for providing a static and dynamic seal between said third swivel body and said second swivel body.

14. The swivel joint as defined in claim 10 wherein said dynamic annular seal means is characterized further to include:
an annular elastomeric member having a cylindrically shaped outer periphery, a cylindrically shaped inner periphery, and frusto-conically shaped opposite end faces interconnecting the inner and outer peripheries, the opposite end faces each tapering axially inwardly and radially outwardly from a line of intersection with the inner periphery; and
an annular metallic seal member, having an L-shaped cross-section, bonded to the exterior of said annular elastomeric member along the line of intersection between one end face and the outer periphery of said annular elastomeric member.

15. The swivel joint as defined in claim 14 wherein said dynamic annular seal means is positioned between said tubular sleeve and said third swivel body with said annular metallic seal member mutually engaging the second end face of said tubular sleeve and the first cylindrical inner surface of said third swivel body.

16. The swivel joint as defined in claim 10 wherein said dynamic annular seal means is characterized further to include:
an annular elastomeric member having a cylindrically shaped outer periphery, a cylindrically shaped inner periphery and frusto-conically shaped opposite end faces interconnecting the inner and outer peripheries and each tapering axially inwardly and radially outwardly from a line of intersection with the inner periphery, the cylindrically shaped inner periphery of said annular elastomeric member including an annular groove formed therein intermediate the opposite end faces; and
a pair of annular metallic seal members, each having an L-shaped cross-section, bonded, respectively, to the exterior of said annular elastomeric member along the lines of intersection between the opposite end faces and the outer periphery of said annular elastomeric member.

17. The swivel joint as defined in claim 16 wherein: the diameters of the first cylindrical inner surface of said first swivel body and the first cylindrical inner surface of said third swivel body are equal; the diameters of the first and second cylindrical outer surfaces of said tubular sleeve are equal; and
said dynamic annular seal means and said static annular seal means are identical in construction and interchangeable one with the other.

18. The swivel joint as defined in claim 17 wherein: the outwardly extending flange of said tubular sleeve is spaced axially equidistant between the first and second end faces thereof.

19. A swivel joint comprising:
a first swivel body having a first end and a second end, said first swivel body having an end face formed on the first end thereof and an outwardly extending flange formed thereon adjacent the first end thereof, a passage extending through said first swivel body communicating the first and second ends, said passage including a first cylindrical inner surface communicating with the end face, a second cylindrical inner surface having a diameter less than the first cylindrical inner surface and an annular shoulder extending between said first and second cylindrical surfaces;
a second swivel body having a first end and a second end, said second swivel body having an end face formed on the first end thereof and an outwardly extending flange formed thereon adjacent the first end thereof, a passage extending through said second swivel body communicating the first and second ends, said passage including a first cylindrical inner surface communicating with the end face, a second cylindrical inner surface having a diameter greater than the first cylindrical inner surface and an annular shoulder extending between said first and second cylindrical surfaces;
a third swivel body having a first end and a second end and having a passage extending therethrough communicating the first and second ends thereof and having a cylindrical outer periphery, said third swivel body being disposed within the second cylindrical inner surface of said second swivel body with the first end thereof adjacent the annular shoulder of said second swivel body, said passage through said third swivel body including a first cylindrical inner surface communicating with the first end of said third swivel body, a second cylindrical inner surface having a diameter less than the first cylindrical inner surface communicating with the second end of said third swivel body, and an annular shoulder extending between the first and second cylindrical inner surfaces;
a tubular sleeve having a first end and a second end and a passage extending therethrough communicating the first and second ends, an outwardly extending flange formed on the exterior of said sleeve intermediate the first and second ends, a first cylindrical outer surface formed on said sleeve extending from the flange to the first end of said sleeve and having a diameter slightly less than the diameter of the first cylindrical inner surface of said first swivel body and being received within the first cylindrical inner surface of said first swivel body, a second cylindrical outer surface formed on said sleeve extending from the flange to the second end of said sleeve and having a diameter slightly less than the diameter of the first cylindrical inner surface of said second swivel body and slightly less than the diameter of the first cylindrical inner surface of said third swivel body, a first end face formed on the first end of said tubular sleeve, a second end face formed on the second end of said tubular sleeve, the second end of said tubular sleeve extending through the first cylindrical inner surface of said second swivel body and extending into the first cylindrical inner surface of said third swivel body;

static annular seal means disposed intermediate the first end face of said tubular sleeve and the first cylindrical inner surface and the annular shoulder of said first swivel body for providing a fluid-tight seal between said sleeve and said first swivel body;

dynamic annular seal means disposed intermediate the second end face of said tubular sleeve and the first cylindrical inner surface and the annular shoulder of said third swivel body for providing a sliding fluid-tight seal between said sleeve and said third swivel body;

rotary bearing means disposed intermediate the cylindrical outer periphery of said third swivel body and the second cylindrical inner surface of said second swivel body for journally supporting said third swivel body within said second swivel body for rotation about the axis of the second cylindrical inner surface of said second swivel body; and clamp means for mutually engaging the flanges of said first and second swivel bodies and engaging the outwardly extending flange of said tubular sleeve between the end faces of said first and second swivel bodies for preventing relative movement therebetween.

* * * * *